US011956707B2

United States Patent
Martin et al.

(10) Patent No.: US 11,956,707 B2
(45) Date of Patent: *Apr. 9, 2024

(54) COMMUNICATIONS DEVICE, INFRASTRUCTURE EQUIPMENT, AND METHODS

(71) Applicant: Sony Group Corporation, Tokyo (JP)

(72) Inventors: Brian Alexander Martin, Basingstoke (GB); Hideji Wakabayashi, Basingstoke (GB); Shinichiro Tsuda, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/493,083

(22) Filed: Oct. 4, 2021

(65) Prior Publication Data

US 2022/0030501 A1 Jan. 27, 2022

Related U.S. Application Data

(63) Continuation of application No. 16/531,147, filed on Aug. 5, 2019, now Pat. No. 11,140,609, which is a (Continued)

(30) Foreign Application Priority Data

Feb. 11, 2015 (EP) .................................... 15154751

(51) Int. Cl.
*H04W 40/22* (2009.01)
*H04W 8/00* (2009.01)
(Continued)

(52) U.S. Cl.
CPC .......... *H04W 40/22* (2013.01); *H04W 8/005* (2013.01); *H04W 40/12* (2013.01); *H04B 7/2606* (2013.01);
(Continued)

(58) Field of Classification Search
CPC ..... H04W 40/22; H04W 40/12; H04W 8/005; H04W 76/14; H04W 76/23; H04W 88/104; H04B 7/2606
(Continued)

(56) References Cited

U.S. PATENT DOCUMENTS 10,531,365 B2 * 1/2020 Kaur ..................... H04W 48/10
2009/0088164 A1 4/2009 Shen et al.
(Continued)

FOREIGN PATENT DOCUMENTS

EP 2785092 A1 10/2014
WO WO-2010078210 A1 * 7/2010 ............. H04B 7/155
(Continued)

OTHER PUBLICATIONS

International Search Report dated Apr. 28, 2016 in PCT/EP2016/051602 filed Jan. 26, 2016.
(Continued)

*Primary Examiner* — Jeffrey M Rutkowski
*Assistant Examiner* — Luna Weissberger
(74) *Attorney, Agent, or Firm* — XSENSUS LLP

(57) ABSTRACT

A communications device configured to transmit signals representing data to one or more in-coverage communications devices forming with the communications device a group, one of the in-coverage communications devices acting as an active relay node for the communications device, so that the in-coverage communications device can transmit signals representing the data to the infrastructure equipment of the mobile communications network, and to receive signals representing the data from the in-coverage communications device acting as the active relay node. The signals transmitted to the in-coverage communications device are received according to a device-to-device communications protocol, wherein the signals transmitted by the communi- (Continued)

cations device or received by the communications device include an identifier which identifies the signals to the in-coverage communications device. One of the other in-coverage communications device can be selected by the infrastructure equipment to act as the active relay node.

19 Claims, 8 Drawing Sheets

Related U.S. Application Data continuation of application No. 15/548,634, filed as application No. PCT/EP2016/051602 on Jan. 26, 2016, now Pat. No. 10,405,257.

(51) Int. Cl.
| | |
|---|---|
| *H04W 40/12* | (2009.01) |
| *H04W 76/14* | (2018.01) |
| *H04B 7/26* | (2006.01) |
| *H04W 36/00* | (2009.01) |
| *H04W 76/23* | (2018.01) |
| *H04W 88/04* | (2009.01) |

(52) U.S. Cl.
CPC ............ *H04W 36/03* (2018.08); *H04W 76/14* (2018.02); *H04W 76/23* (2018.02); *H04W 88/04* (2013.01)

(58) Field of Classification Search
USPC ........................................................ 370/315
See application file for complete search history.

(56) References Cited

U.S. PATENT DOCUMENTS

| | | |
|---|---|---|
| 2009/0252079 A1 | 10/2009 | Zhang et al. |
| 2009/0303918 A1 | 12/2009 | Ma et al. |
| 2010/0167743 A1 | 7/2010 | Palanki et al. |
| 2012/0044836 A1 | 2/2012 | Sivavakeesar et al. |
| 2013/0016646 A1 | 1/2013 | Chang et al. |
| 2013/0064173 A1 | 3/2013 | Sivavakeesar et al. |
| 2013/0064179 A1 | 3/2013 | Attar et al. |
| 2014/0012162 A1 | 1/2014 | Harris et al. |
| 2014/0112162 A1 | 4/2014 | Tavildar et al. |
| 2014/0133332 A1 | 5/2014 | Lee |
| 2014/0295827 A1 | 10/2014 | Tesanovic et al. |
| 2015/0029866 A1 | 1/2015 | Liao et al. |
| 2015/0215764 A1 | 7/2015 | Tavildar et al. |
| 2017/0223753 A1* | 8/2017 | Höglund ............... H04W 88/04 |

FOREIGN PATENT DOCUMENTS

| | | | | |
|---|---|---|---|---|
| WO | WO-2015004142 A1 * | 1/2015 | ........ | H04W 36/0077 |
| WO | 2015/110228 A1 | 7/2015 | | |
| WO | 2015/113689 A1 | 8/2015 | | |
| WO | 2015/113690 A1 | 8/2015 | | |
| WO | 2015/113696 A1 | 8/2015 | | |
| WO | 2015/113719 A1 | 8/2015 | | |
| WO | 2015/113720 A1 | 8/2015 | | |
| WO | 2016/038164 A1 | 3/2016 | | |
| WO | 2016/128277 A1 | 8/2016 | | |

OTHER PUBLICATIONS

H. Holma, et al., "LTE for UMTS OFDMA and SC-FDMA Based Radio Access," 2009, 4 pages.
Study on LTE Device to Device Proximity Services, 2012, 3GPP TSG RAN Meeting #58, RP-122009, 6 pages.
Work Item Proposal for Enhanced LTE Device to Device Proximity Services, Dec. 2014, 3GPP TSG RAN Meeting #66, RP-142229, 8 pages.
3rd Generation Partnership Project; Technical Specification Group Services and System Aspects; Study on architecture enhancements to support Proximity-based Services (ProSe) (Year: 2014).
3rd Generation Partnership Project; Technical Specification Group Radio Access Network; study on LTE Device to Device Proximity Services; Radio Aspects (Release 12), 2014, 3GPP TR 36.843, V12.0.1, 50 pages.
3rd Generation Partnership Project; Technical Specification Group Services and System Aspects; study on architecture enhancements to support Proximity-based Services (ProSe) (Release 12), 2014, GPP TR 21703, V1 .1.0, 324 pages, XP050729424.
3rd Generation Partnership Project; Technical Specification Group Services and System Aspects; Proximity-based services (ProSe); Stage 2 (Release 12), 2014, 3GPP TS 23.703, V12.2.0, 61 pages, XP050925474.

* cited by examiner

COMMUNICATIONS DEVICE, INFRASTRUCTURE EQUIPMENT, AND METHODS

CROSS-REFERENCE TO RELATED APPLICATIONS

This application is a continuation of U.S. application Ser. No. 16/531,147, filed Aug. 5, 2019, which is a continuation of U.S. application Ser. No. 15/548,634, filed Aug. 3, 2017 (now U.S. Pat. No. 10,405,257), which is based on PCT filing PCT/EP2016/051602, filed Jan. 26, 2016, and claims priority to EP 15154751.0, filed Feb. 11, 2015, the entire contents of each are incorporated herein by reference.

BACKGROUND

Field of Disclosure

Technical Field of the Disclosure

The present disclosure relates to communications devices and methods for communicating data using communications devices, and in particular to communications devices which are configured to perform device-to-device communications.

Background of the Disclosure

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within the coverage area of a network. In order to address these limitations, in LTE release-12 the ability for LTE communications devices to perform device-to-device (D2D) communications will be introduced.

D2D communications allow communications devices that are in close proximity to directly communicate with each other, both when within and when outside of a coverage area or when the network fails. This D2D communications ability can allow user data to be more efficiently communicated between communications devices by obviating the need for user data to be relayed by a network entity such as a base station, and also allows communications devices that are in close proximity to communicate with one another although they may not be within the coverage area of a network. The ability for communications devices to operate both inside and outside of coverage areas makes LTE systems that incorporate D2D capabilities well suited to applications such as public safety communications, for example. Public safety communications require a high degree of robustness whereby devices can continue to communicate with one another in congested networks and when outside a coverage area.

Whilst D2D communications techniques can provide an arrangement for communicating between devices when the communications devices are outside a coverage area provided by mobile communications network, the D2D communications techniques can also provide an arrangement for extending an coverage area of the mobile communications network, when one of the communications devices is within the coverage area and another is outside the coverage area.

SUMMARY OF THE DISCLOSURE

According to a first example embodiment of the present technique there is provided a communications device, which includes a transmitter configured to transmit signals to one or more other communications devices via a wireless access interface in accordance with a device-to-device communications protocol, the wireless access interface for transmitting signals to an infrastructure equipment of a mobile communications network when within a radio coverage area of the infrastructure equipment. A receiver is configured to receive signals from the one or more other communications devices via the wireless access interface, the wireless access interface being for receiving signals from the infrastructure equipment of the mobile communications network when within the radio coverage area of the infrastructure equipment. A controller is configured to control the transmitter and the receiver to transmit or to receive the signals via the wireless access interface to transmit or to receive data represented by the signals, and the controller is configured with the transmitter to transmit signals representing the data to one or more in-coverage communications devices forming, with the communications device, a group, one of the in-coverage communications devices acting as an active relay node for the communications device, so that the in-coverage communications device is able to transmit signals representing the data to the infrastructure equipment of the mobile communications network, and to receive signals representing the data from the in-coverage communications device acting as the active relay node. The signals transmitted to the in-coverage communications device and the signals from the in-coverage communications device acting as the active relay nodes are transmitted via predetermined communications resources according to the device-to-device communications protocol. The signals transmitted to the in-coverage communications device are received according to the device-to-device communications protocol, wherein the signals transmitted by the communications device or received by the communications device include an identifier which identifies a connection between the communications device and the in-coverage communications device acting as an active relay node.

In some embodiments one of the other in-coverage communications device can be selected by the infrastructure equipment to act as the active relay node, in place of the communications device from measurements made by the one or more other in-coverage communications devices from the signals transmitted on the predetermined communications resources.

Embodiments of the present technique can provide an arrangement in which, an out-of-coverage communications device, which is using an in-coverage communications device to act as an active relay node to communicate data to and/or from an infrastructure equipment can be changed to use another in-coverage communications device when predetermined conditions are detected. The out-of-coverage communications device may be unaware of the change of the active relay node. For example, the infrastructure equipment can detect that the predetermined conditions have been satisfied and then switch the active relay node from the first in-coverage communications device to one of the one or more other communications devices, of which the out-of-coverage communications device may be unaware.

In some examples, the group of communications devices may comprise only two active communications devices, the out-of-coverage communications device and the in-coverage communications device. For this example, an identifier transmitted with the signals is a unicast identifier, which identifies the one-to-one connection between the out-of-coverage communications device and the in-coverage communications device, or the one-to-one connection between the out-of-coverage device and the communications network which uses the in-coverage device as a relay. In other examples the identifier identifies a group of communications devices, which may include one in-coverage communications devices and the out-of-coverage communications device. The identifier may therefore identify the connection between the out-of-coverage communications device and the in-coverage communications device to the infrastructure equipment.

The in-coverage communications device can be replaced with another in-coverage communications device, which is currently the active relay node, as the active relay node for the out-of-coverage communications device.

According to another example embodiment of the present technique, there is provided a communications device, which acts as an active relay node and comprises a transmitter configured to transmit signals to one or more other communications devices via a wireless access interface in accordance with a device-to-device communications protocol and configured to transmit signals via the wireless access interface to an infrastructure equipment of a mobile communications network when within a radio coverage area of the infrastructure equipment. A receiver is configured to receive signals from the one or more other communications devices via the wireless access interface in accordance with the device-to-device communications protocol and to receive signals via the wireless access interface from the infrastructure equipment of the mobile communications network when within the radio coverage area of the infrastructure equipment. A controller controls the transmitter and the receiver to transmit or to receive the signals via the wireless access interface to transmit or to receive data represented by the signals, and the transmitter and the receiver are configured with the controller to receive the signals representing data transmitted by an out-of-coverage communications device which is not able to transmit signals to the infrastructure equipment, to transmit the signals representing the data received from the out-of-coverage communications device to the infrastructure equipment, or to receive the signals from the infrastructure equipment representing the data for the out-of-coverage communications device, and to transmit the signals to the out-of-coverage communications device, the communications device acting as an active relay node for the out-of-coverage communications device. The signals received by the receiver from the out-of-coverage communications device and the signals transmitted by the communications device to the out-of-coverage communications device are transmitted via predetermined communications resources of the wireless access interface according to the device-to-device communications protocol, and the signals can be received by one or more other in-coverage communications devices, which, with the out-of-coverage communications device and the communications device form a group of communications devices which communicate using the device-to-device communications protocol.

According to example embodiments of the present technique a group of communications devices are arranged to perform device-to-device communications using commonly identified predetermined resources for which each of the devices of the group can detect signals transmitted by other devices in the group. The transmitted signals may be identified by a group identifier and/or a source/destination identifier of the signals and/or any temporary or persistent/semi-persistent identifier which is associated with the communication between the one or more out of coverage devices, the one or more in-coverage devices and the infrastructure equipment. As such, for an example in which one of the devices of the group is operating out-of-coverage, one of the other devices of the group can operate as a relay node if this device is in-coverage. Furthermore the other devices of the group which are in coverage can detect signals transmitted in the predetermined communications resources transmitted by the out-of-coverage device. The other in-coverage devices can determine a received signal strength of the received signals and report the received signal strength to the infrastructure equipment. When the in-coverage device, which is acting as a source relay node is detected as providing a reduced link quality according to predetermined conditions, then the infrastructure equipment can direct one of the other in-coverage communications device to become a active relay node in accordance with a selection based on the reported received signal strength measurements.

Various further aspects and features of the present disclosure are defined in the appended claims and include a communications device, a method of communicating using a communications device.

BRIEF DESCRIPTION OF DRAWINGS

Embodiments of the present disclosure will now be described by way of example only with reference to the accompanying drawings wherein like parts are provided with corresponding reference numerals and in which.

DESCRIPTION OF EXAMPLE EMBODIMENTS

Conventional Communications System

Figure 1:
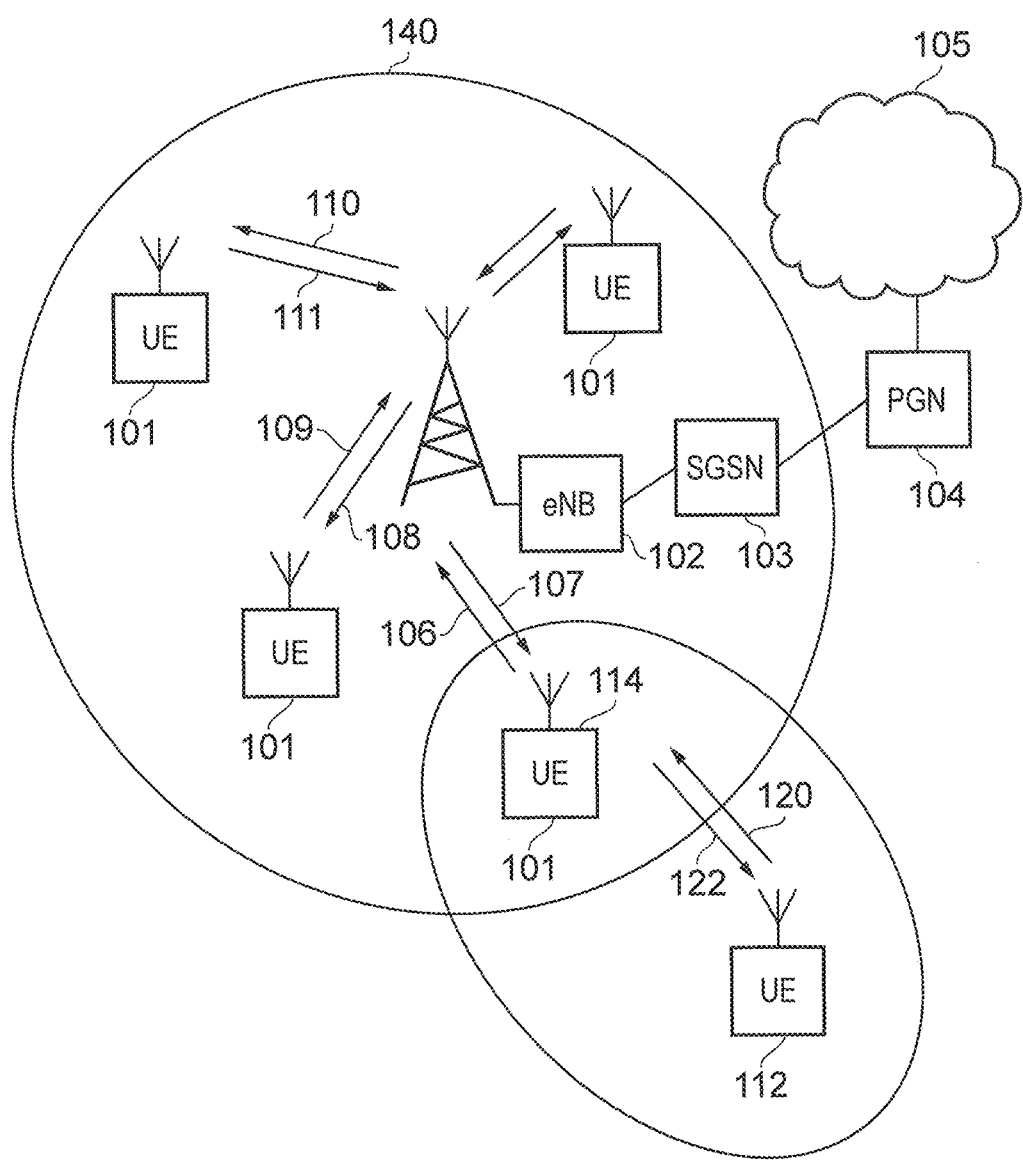
FIG. 1 provides a schematic diagram of a mobile communications system in which in coverage communications devices are communicating via an infrastructure equipment and at least one out-of-coverage communications device is communicating via one of the in-coverage communications devices.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

FIG. 1 provides a schematic diagram of a conventional mobile telecommunications system 100, where the system includes mobile communications devices 101, infrastructure equipment 102, and a core network comprising a serving gateway node 103, a packet data gateway 104 which forms a gateway to an external network 105. The infrastructure equipment 102 may also be referred to as a base station, network element, enhanced Node B (eNodeB) or a coordinating entity for example, and provides a wireless access interface to the one or more communications devices within a coverage area or cell. The one or more mobile communications devices may communicate data via the transmission and reception of signals representing data using the wireless access interface. The infrastructure equipment 102 is communicatively linked via the serving gateway node 103 and the packet data gateway 104 to the external network 105, which may be connected to one or more other communications systems or networks which have a similar structure to that formed from communications devices 101 and infrastructure equipment 102. The core network may also provide functionality including authentication, mobility management, charging and so on for the communications devices served by the network entity.

The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links represented by lines 106 to 111, where arrows 106, 108 and 110 represent downlink communications from the network entity to the communications devices and arrows 107, 109 and 111 represent the uplink communications from the communications devices to the infrastructure equipment 102. The communications system 100 may operate in accordance with any known protocol, for instance in some examples the system 100 may operate in accordance with a 3GPP Long Term Evolution (LTE) standard where the infrastructure equipment 102 may be referred to as a base station or an enhanced Node B (eNodeB(eNB)).

Also shown in FIG. 1 is a line 140 which represents an indication of a maximum range within which radio signals can be communicated to and from the infrastructure equipment or eNB 102. As will be appreciated the line 140 is just an illustration and in practice there will be a great variation in respect of the propagation conditions and therefore the range in which radio signals can be communicated to and from the eNB 102. As shown in FIG. 1, in one example one of the communications devices 112 has moved to an area which is outside the line 140 representing a range within which radio signals can be communicated to and from the eNB 102. According to the present technique the communications terminal 112 which is outside the range of the eNB 102 may still communicate data to and from the eNB 102 but this is achieved by relaying the data via one of the UE's 114 which acts as a relay node to the communications terminal 112. In accordance with our co-pending International patent applications with the application numbers PCT/2014/078087, PCT/2014/078093, PCT/2014/079338, PCT/2014/077447, PCT/2014/077396, PCT/2014/079335, the content of which are herein incorporated by reference there is provided a device communications technique which allows one or more communications devices to form a group of communications devices which can communicate data between the group of communications devices without being communicated via an eNB. Such an arrangement can operate within or without a coverage area provided by a base station or eNB.

In one example 3GPP have completed a study item entitled "LTE Device to Device Proximity Services-Radio Aspects" described in a technical report TR36.843. According to the present technique therefore an arrangement is provided in which a UE 112 which falls outside a coverage area of an eNB 102 is able to communicate to the eNB 103 using one of the UEs which is within coverage by acting as a relay node. To this end, UEs 112, 114 perform device-to-device (D2D) communications. However, a technical problem addressed by the present technique concerns an arrangement in which an out-of-coverage UE 112 performs a handover to another in-coverage UE 114 which is to act as a relay node.

In a situation in which an out-of-coverage UE is communicating with a mobile communications network via an in-coverage UE acting as a relay node, there are several mobility scenarios which can be considered. After an initial relay selection by an out-of-coverage UE there needs to be a way to select and connect from a source relay UE to a target relay UE. Such an intra relay UE handover or re-selection requires an arrangement in which an out-of-coverage UE discovers the target relay UE. However, since an in-coverage UE acting as a relay node may not always be transmitting a downlink signal, for example a discovery beacon signal, then it may not be possible to make a comparison of measurements from the current or source relay UE node (relay or eNB) and a potential target relay node (relay). This differs from the typical handover from a source eNB to a target eNB, because the eNB always transmits downlink common channels and synchronisation channels, so that the UE can always perform the measurement.

Accordingly a technical problem addressed by the present technique concerns an arrangement in which an out-of-coverage UE changes from one in-coverage UE acting as a relay node to another in-coverage UE acting as a relay. In the following description these will be referred to as a source relay-UE and a target relay-UE.

LTE Wireless Access Interface

A brief description of the LTE wireless access interface is explained in the following paragraphs with reference to FIGS. 2 and 3 to support the explanation of the example embodiments of the present technique which are provided in the following paragraphs.

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. In accordance with the present technique, the wireless access interface for both the down-link shown in FIG. 2 and the up-link shown in FIG. 3 can provide a facility for communicating data from a UE to a mobile communications network via the eNB and for communicating data to the UE from the eNB, but can also provide communications resources for performing D2D communications to another communications device without being communicated via the eNB. The down-link and the up-link of the wireless access interface of FIGS. 2 and 3 respectively will now be explained.

Figure 2:
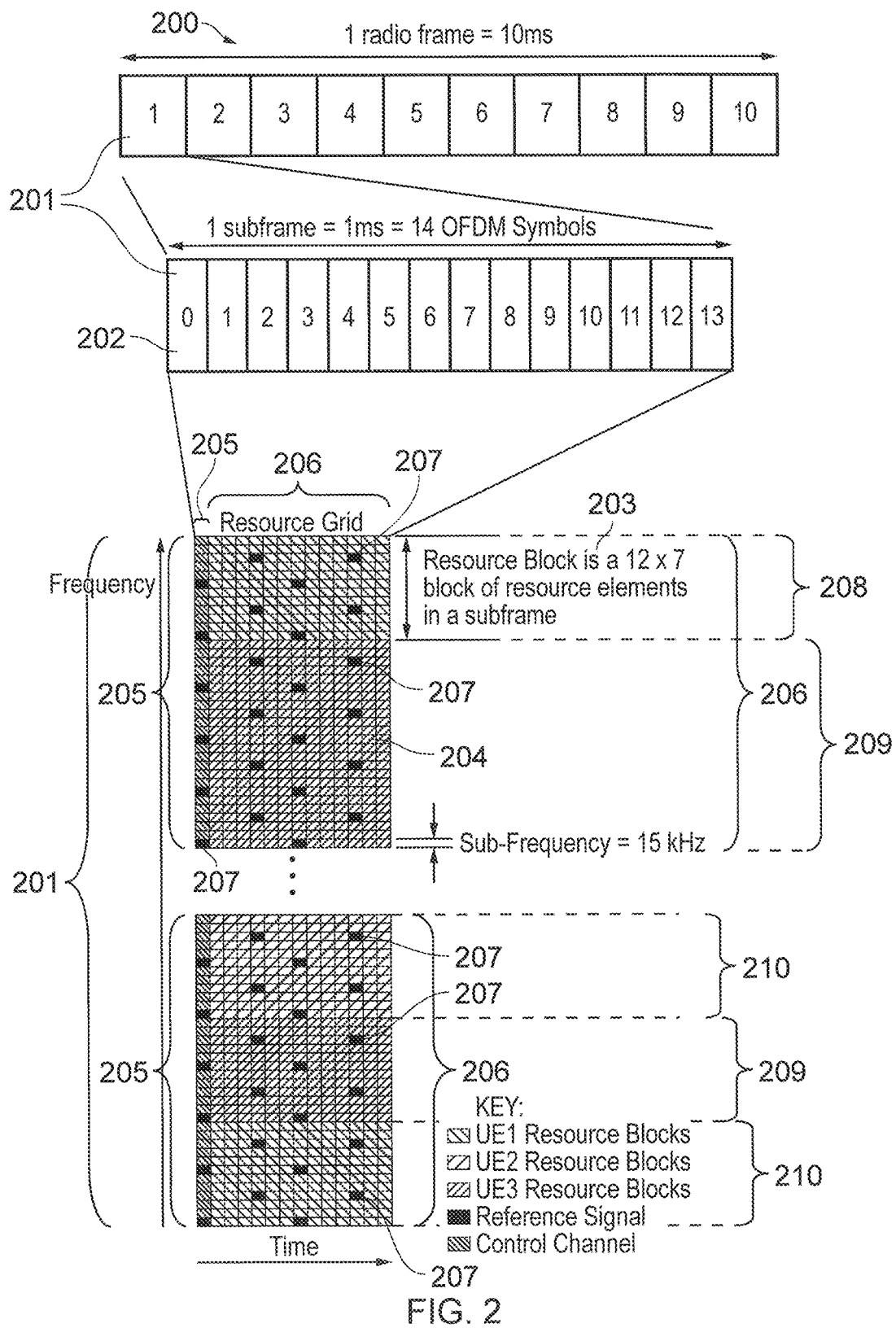
FIG. 2 provides a schematic diagram of the structure of a downlink of a wireless access interface of a mobile communications system.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is fixed at 15 KHz. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the down-link structure of the LTE wireless access interface are provided in Annex 1.

Figure 3:
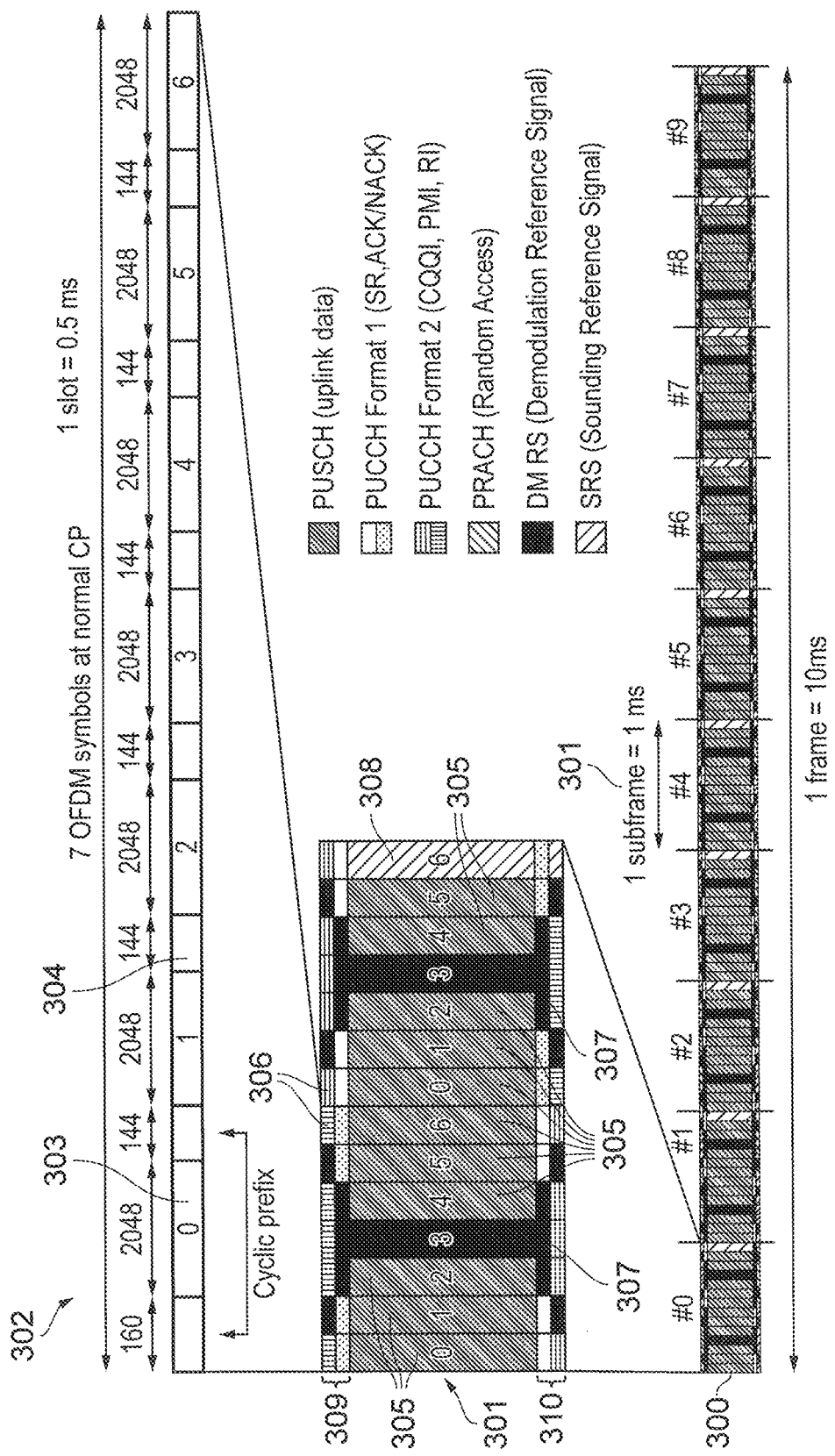
FIG. 3 provides a schematic diagram of an uplink of a wireless access interface of a mobile communications system.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. More details of the LTE up-link represented in FIG. 3 are provided in Annex 1.

Supporting an Out-of-Coverage Communications Device

It has previously been proposed to provide some arrangement for device to device communication within standards which define communications systems according to specifications administered by the 3GPP referred to as Long Term Evolution (LTE). These are defined in LTE Release 12 and Release 13 and provide a facility for D2D communications. More generally, a number of possible approaches to the implementation of LTE D2D communications exist. For example, the wireless access interface provided for communications between UEs and eNodeB may be used for D2D communications, where an eNB allocates the required resources and control signalling is communicated via the eNB but user data is transmitted directly between UEs.

In our co-pending International patent applications with the application numbers PCT/2014/078087, PCT/2014/078093, PCT/2014/079338, PCT/2014/077447, PCT/2014/077396, PCT/2014/079335, there is disclosed various techniques for performing D2D communications between devices using the LTE up-link shown in FIG. 3. For example, in the International patent application PCT/2014/079338, there is disclosed an arrangement for performing contentious resolution for D2D communications. Similarly, an arrangement for allocating resources using a scheduling assignment messages transmitted in a scheduling assignment region of an uplink transmission frame is disclosed in International patent application PCT/2014/078093. An arrangement in which communications devices of limited capability which may form machine to machine communications devices can be arranged to perform device to device communications within a limited set of resources (referred to as a virtual carrier) as disclosed in International patent application PCT/2014/077447. Furthermore, an arrangement for identifying resources which can be used for device to device communications between a group of communications devices is disclosed in International patent application PCT/2014/079335, the content of all of the above International patent applications are incorporated into the present application by reference. As will be appreciated therefore these co-pending international patent applications disclose an arrangement for an out-of-coverage UE 112 to communicate on a forward or up-link to an in-coverage UE acting as a relay node 114, represented by an arrow 120 in FIG. 1 and to communicate on a reverse or down-link from the relay-UE 114 to the out-of-coverage UE 112 as represented by an arrow 122 in FIG. 1.

Figure 4:
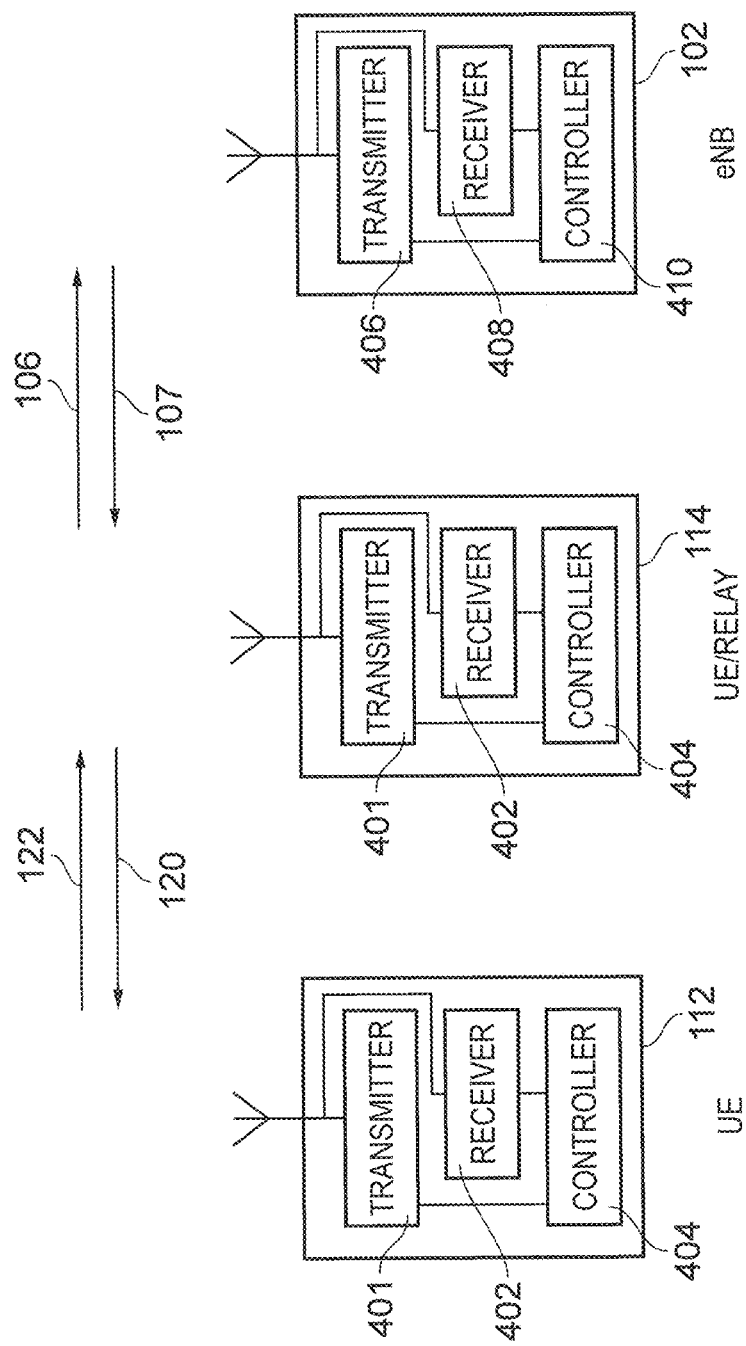
FIG. 4 provides a schematic diagram of an out-of-coverage communications device communicating on an uplink and a downlink with an infrastructure equipment via an in-coverage communications device.

FIG. 4 shows a schematic block diagram of a communications path between the out-of-coverage UE 112 and the eNB 102, via the in coverage UE acting as a relay node 114. As shown in FIG. 4 the out-of-coverage UE 112 includes a transmitter 401 a receiver 402 and a controller 404 to control the transmission and reception of signals to the in coverage UE 114 acting as a relay node. The up-link signals are represented by an arrow 120 which corresponds to that shown in FIG. 1 and the downlink signals are shown by an arrow 122, which corresponds to that shown in FIG. 1. The relay UE 114 could be a conventional UE and so includes also a transmitter 401 receiver 402 and a controller 404. The in coverage UE acting as a relay node 114 operates in accordance with a conventional arrangement but transmits signals on the uplink as shown by an arrow 107 and receives signals on the downlink as represented by an arrow 106 to and received from the eNB 102 respectively. The eNB 102 includes a transmitter 404 a receiver 408 and a controller 410 which may include a scheduler for scheduling the transmission and reception of signals on the downlink and the uplink in accordance with the wireless access interface shown in FIGS. 2 and 3.

Figure 5:
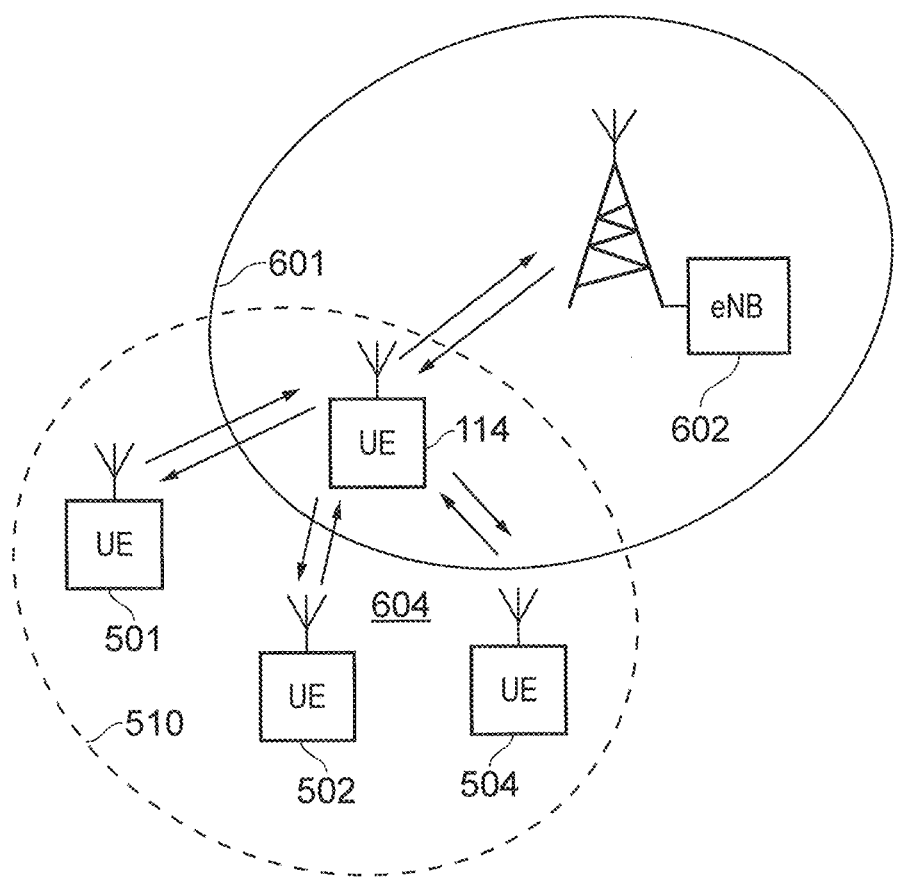
FIG. 5 provides a schematic block diagram illustrating an arrangement in which a plurality of communications devices form a group, which perform device-to-device communications.

As explained above, embodiments of the present technique can provide an arrangement for extending the coverage of an eNB, by utilising D2D communications techniques. An example application is presented in FIG. 5. In FIG. 5, a plurality of communications devices 501, 502, 504, 114 form a group of communications devices 604 for which D2D communications is desired for the reasons explained above. As represented in FIG. 5, the communications devices 501, 502, 504, are outside a coverage area represented by a line 601 of an eNB or base station 602. As such the eNB 602 cannot form or control any of the communications between the out-of-coverage communications devices 501, 502, 504. According to the present technique a plurality of communications devices 604 may perform D2D communications whether they are in coverage or out-of-coverage of an eNB 102. As shown in FIG. 5 the group of devices 604 includes UEs 501, 502, 504, which are out-of-coverage of the eNB 602 with one of the UEs 114 within coverage. To this end, an in coverage UE 114 is operating to act as a relay node. Accordingly, in one example, the out-of-coverage UEs 501, 502, 504 may form a virtual cell with the relay node or in coverage UE 114 acting as a base station for each of these out-of-coverage UEs 501, 502, 504. Accordingly, a broken or dash line 510 illustrates a coverage area of a virtual cell formed by the in coverage UE 114. In one example, all control plane signalling is communicated to the eNB 102 via the in coverage UE 114 acting as a relay node so that the control plane is managed by the virtual cell.

As explained above, embodiments of the present technique can provide an arrangement in which an eNB which is communicating with an out-of-coverage UE, via a first in-coverage UE acting as an active relay UE can identify a second in-coverage UE to act as the active relay node in place of the first relay UE. The change from the first in-coverage UE as the active relay UE to the second in-coverage UE may be triggered when the first relay UE can no longer act as a relay node because the communications link with that first relay UE is no longer viable, or the second relay UE is able to provide a more reliable communication due to more favourable radio conditions or other criteria. Accordingly embodiments of the present technique can provided an arrangement in which an eNB can switch from using a first in coverage UE acting as a relay node to another. Conventionally UE's perform measurements of beacon signals transmitted by base stations of eNBs in order to determine which eNB provides a better link quality where a beacon signal received from a currently used base station falls below a pre-determined level. Embodiments of the present technique can provide in one example:

An arrangement in which a plurality of in-coverage UE are configured to be prepared to act as the relay, by utilising a 1:M broadcast facility provided for L3 relaying.

These in-coverage UEs perform measurements of the transmissions from an out-of-coverage UE on known resources
- May be measurements on known resources the UE may use for data (PSSCH) or scheduling control (PSCCH) transmission
- May require UE to trigger a beacon signal based on measurement threshold as described in our reference P106523EP (e.g. signal on PSBCH or synchronisation signal transmission)

The relay UEs report measurements to the eNB.
- Either event triggered (threshold based) or periodic.

The eNB determines which relay has reported the best measurement result
- e.g. highest measured RSRP from out-of-coverage UE The eNB then switches/selects the UE reporting the best measurement for next transmissions.
- Since the out-of-coverage UE will just be monitoring for particular resources/ID the actual relay selected may be transparent to the UE. Newly selected relay will use the same resources and ID.
- Multiple relays may forward the data transmitted by the UE to the eNB, or only a single relay (current selected relay) may forward the data at any time. If only a single UE performs data forwarding, still multiple UEs will perform measurements and reporting to the eNB.

Intra-MME/Serving Gateway Handover

Figure 6:
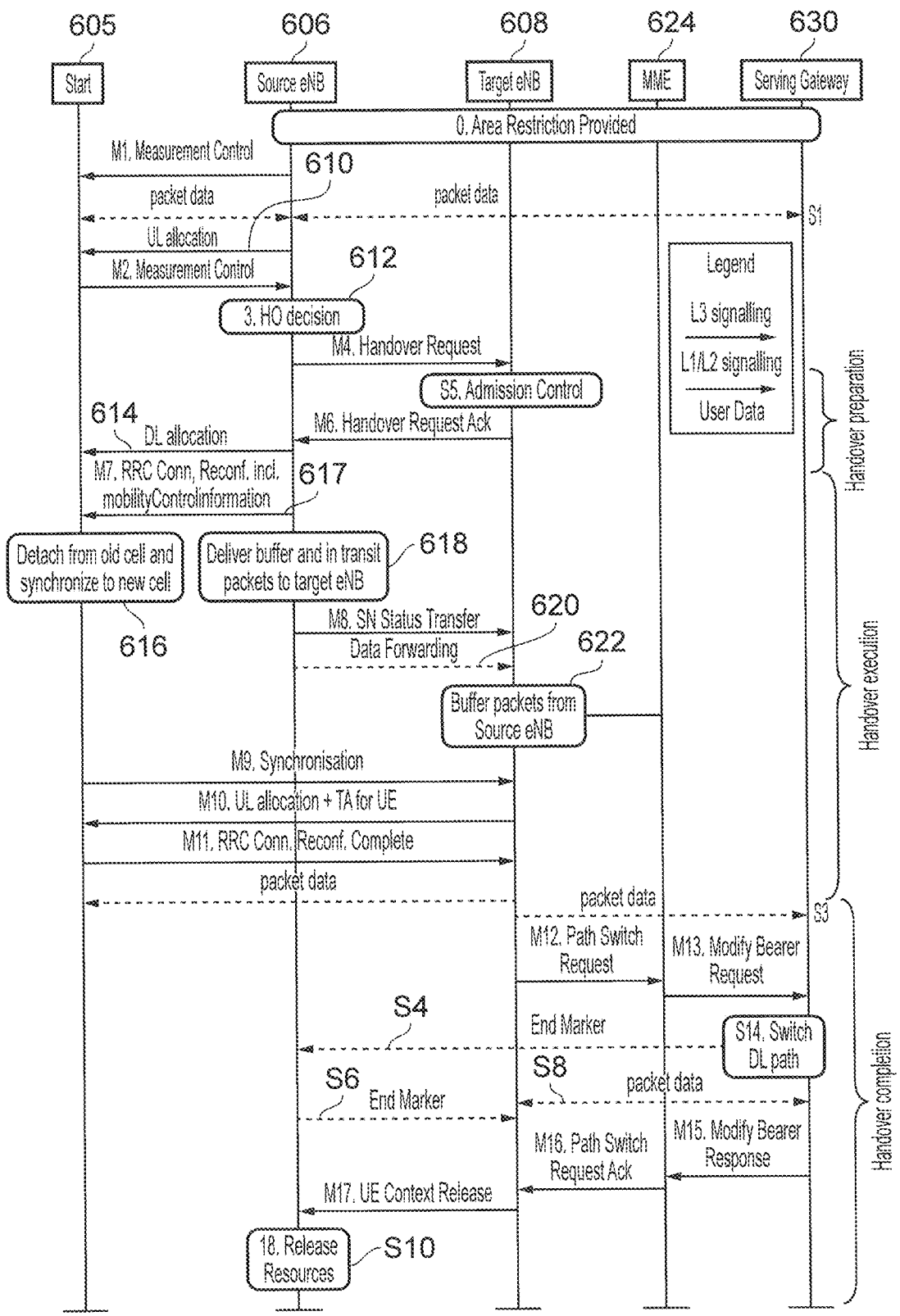
FIG. 6 is an illustrative representation of a message exchange flow diagram for an intra-Mobility Management Entity (MME)/Serving Gateway handover process according to an conventional arrangement of an LTE standard.

As background, in order to provide a better appreciation of example embodiments of the present technique a brief description of a conventional handover technique by a UE from a source eNB 606 to a target eNB 608 is provided in FIG. 6. FIG. 6 presents a message flow diagram of a current handover procedure for LTE between eNBs 606, 608. A more detailed description of FIG. 6 is provided in Annex 2.

As will be appreciated from the flow diagram shown in FIG. 6, several steps and processes are conventionally formed in connection with a handover from a source eNB 606 to the target eNB 608. A technical problem is then presented because a UE which is constructed to operate and communicate via the wireless access interface shown in FIGS. 2 and 3 must be adapted to perform a handover process from one relay node to another. Furthermore, the relay nodes may themselves be fluctuating because they maybe mobile so that the group of UEs which are out-of-coverage and in coverage maybe dynamically changing as these UEs move around. Therefore according to the present technique, handover between relay UEs should follow a similar procedure, to that shown in FIG. 6.

The present technique therefore provides an arrangement, which allows an eNB to select a different in-coverage UE to act as a relay node in accordance with a best available communications path to and from the out of coverage UE. Embodiments of the present technique can provide an arrangement in which an out-of-coverage UE does not need to perform reselection or comparison of signals from a plurality of in-coverage UEs which can act as a relay node for the out-of-coverage UE. The reselection is controlled and triggered by the eNB and is performed without any handover signalling to the out-of-coverage UE. The out-of-coverage UE is configured according to an example embodiment with the relevant resources and an identifier, such as for example a temporary mobile group identifier (TMGI) upon initial relay selection/configuration.

Figure 7:
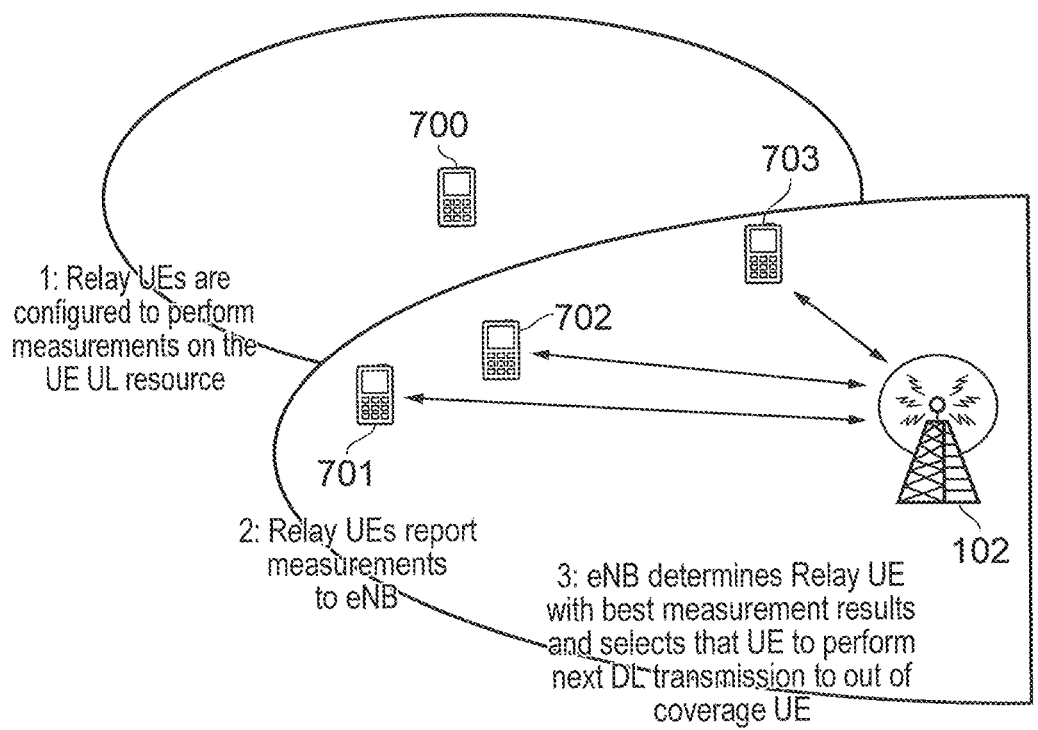
FIG. 7 is a schematic representation of part of an example process in which an out-of-coverage communications device changes an affiliation for communicating data to an infrastructure equipment from one in-coverage communications device acting as a source relay node to another in-coverage communications device acting as a target rely node.

An example embodiment is shown in FIG. 7. According to the example embodiment shown in FIG. 7, in which for simplicity, three possible in-coverage UEs 701, 702, 703 are provided as an example to illustrate an example embodiment of the present technique. According to an example embodiment of the present technique, each of the in-coverage UEs 701, 702, 703 can act a relay node to an out-of-coverage UE 700. Furthermore the out-of-coverage UE 700 does not need to be aware of which of the in-coverage UEs is acting as a relay node.

As shown in FIG. 7, the in-coverage UEs are able to measure the D2D resources and so are able to detect signals transmitted by the out-of-coverage UE. Essentially the out-of-coverage UE 700 and the in-coverage UEs 701, 702, 703 form a group of communications devices performing D2D communications as the example group 604 shown in FIG. 5. As explained above, the D2D group of communications devices 700, 701, 702, 703 are arranged to transmit and receive on known communications resources, which may form part of the LTE uplink as explained in the above mentioned co-pending International patent applications. The group may have a group identifier for data transmitted via the shared communications resources, as well as an identifier which may identify an individual UE or service or radio bearer in the group. Therefore according to the present technique data transmitted by the out-of-coverage UE 700 may be detected by any of the in-coverage UEs 701, 702, 703 and so any of these in-coverage UEs forming part of the D2D group may act as a relay node.

Figure 8:
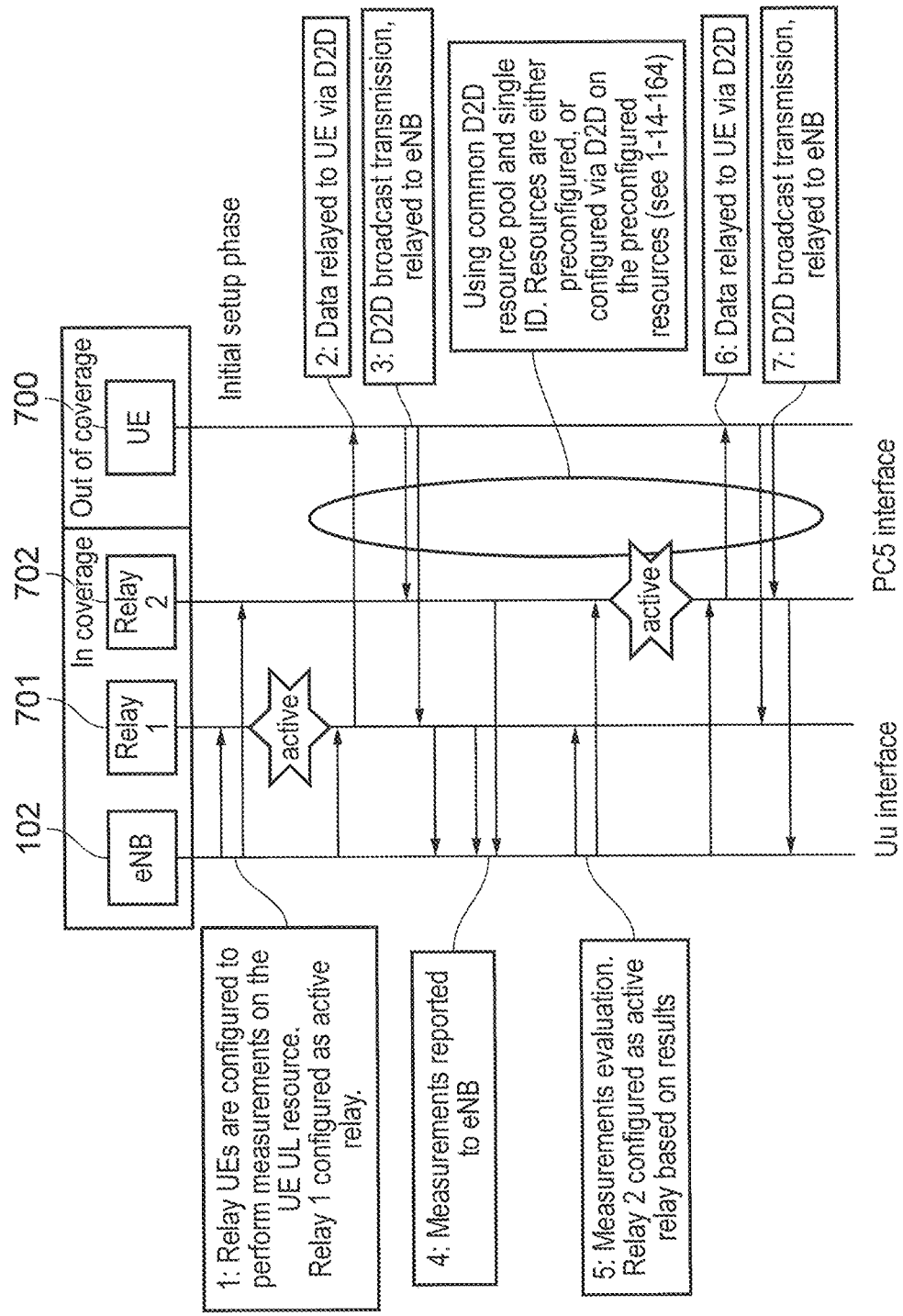
FIG. 8 is a part message exchange part flow diagram illustrating an example embodiment of the present technique.

An example process for one of the in-coverage UEs for an out-of-coverage UE according to the present technique as illustrated by the flow diagram shown in FIG. 8, which shows an example in which only two in-coverage UEs 701, 702 are available for simplicity. Thus the group of D2D communications devices comprises the out-of-coverage UE 700 and the two in-coverage UEs 701, 702. The example process shown in FIG. 8 is summarised as flows:

In step 1, during an initial setup phase, the in-coverage UEs 701, 702 which can act as relay nodes are configured to perform and report measurements of D2D transmissions to the eNB 102. From the reported measurements, an initial active relay is selected. There may be several ways to perform this step, and so the present technique should not be limited to this initial phase. Example ways may be to perform a D2D discovery transmission from all in-coverage UEs 701, 702, and then the out-of-coverage UE may selects. Alternatively the out-of-coverage UE may send a transmission requesting that one of the in-coverage UE acts as a relay node. All of this maybe done using the resource pool configured for out-of-coverage transmissions and monitoring, or a specific resource pool may be assigned, for example in the way described in European patent application EP14184600.6, the content of which are herein incorporated by reference. The result will be that the out-of-coverage UE 700 may perform D2D broadcast transmissions in resources from a set (pool) which is known to the in-coverage UEs 701, 702, and the in-coverage UEs 701, 702 may perform a D2D broadcast transmission in resources from a set (pool) which is known to the out-of-coverage UE. During the initial setup, relevant identifiers such as a group identifier/TMGI/destination and source identifiers are assigned, and all of the D2D broadcast communication includes the relevant identifier(s). Furthermore, although a measurement setup may be configured using an RRC message, the relay "activation" may be implicit and performed as part of the eNB 102 sending data to a specific UE using the relevant radio bearer in step 2. In other words, an in-coverage UE becomes an active relay node when it receives data with the relevant identifier. In FIG. 8 signals are shown separately for ease of illustration.

In step 2, data received from the eNB 102 is relayed to the out-of-coverage UE 700 by means of a D2D broadcast communication. This may contain control and/or data, which may be transparent to the D2D PC5 interface, for example control data for a D2D application layer, or may be RRC control for the out-of-coverage UE, or user plane data such as video or voice. This is done using communications resources, which are configured for the out-of-coverage UE 700 to monitor, the specific resources are likely to be scheduled by the eNB 102. This may be done in way which corresponds with 3GPP release-12, for example the Relay UE sends D2D scheduling request to the eNB 102 and the eNB 102 grants some communications resources, or it could be optimised such that the eNB 102 schedules resources when the data to be relayed is sent to the relay UE.

In step 3, the out-of-coverage UE 700 sends some data using resources from a pool, from which it has been configured to select, in for example a corresponding way to that provided for a 3GPP release-12 D2D broadcast functionality, for example using a new separate resource pool, or a generic pool the same as Release 12. The active relay forwards this to the eNB using regular LTE uplink. In one example the active relay may transmit the data with a relay and a service specific radio bearer configuration. In some embodiments all of the potential relay nodes may relay data received from the out-of-coverage UE, although in the present example it is assumed that just one in-coverage UE does that.

In step 4 the configured in-coverage UEs acting as relays send measurements to the eNB 102. This may be triggered only when the measurement result is above a set predetermined threshold, for example above a threshold quality level. This may also be triggered upon detection of D2D data in the specific communications resources, or may be sent periodically. A current definition of RSCP for D2D transmissions is based on the source UE sending a D2DSS, therefore this may require the out-of-coverage UE to send a D2DSS at specific times (e.g. periodically, or before/after a transmission), or an alternative would be to define a new measurement which can be done using the other D2D physical channels (e.g. data resources). Another alternative is that the measurement is simply an indication of whether the relay managed to receive D2D transmissions from the out-of-coverage UE. The measurement is shown here separately and is assumed to be an RRC MEASUREMENT REPORT. However there are other options such as sending measurement information along with the relayed data in step 3. The indication that an in-coverage UE 701, 702 managed to receive D2D data from the out-of-coverage UE 700 might also be implicit from the fact that the in-coverage UE 700 sends a scheduling request to the eNB 102 and then the eNB responds with data and communications resources.

In step 5 the eNB 102 performs evaluation of the measurement results received from the in-coverage UEs and selects the best in-coverage UE to act as an active relay node, which may be the same or a different relay. The most basic implementation would be simply to compare the measurements and select the highest quality. In one example this is performed by the eNB. The eNB 102 according to one implementation may take into account other factors, for example even though one of the in-coverage UEs 701 may have the best measurement, a second of the in-coverage UEs 702 may be the only option for another out-of-coverage UE, while the first in-coverage UE 701 may be only suitable for this out-of-coverage UE 700 and hence the first in-coverage UE 701 will be selected. The quality of the radio link between the eNB 102 and the in-coverage UEs 701, 702 may also be used to select the in-coverage UE to act as a relay node.

In step 6 the eNB 102 activates the second in-coverage UE 702 to act as a relay node of the out-of-coverage UE 700 and deactivates the first in-coverage UE 701. As with step 1, this is shown separately and assumed to be RRC signalling, but it could be implicit as part of sending the user place data to a specific UE.

Steps 7 and 8 are the same as steps 2 and 3, using a different relay.

Summary

From the above explanation it will be appreciated that embodiments of the present technique can provide:

Relay selection/reselection can be done without requiring any additional signalling on the D2D resources.

Switching of relays is performed in eNB and under control of eNB based on measurements reported by the in-coverage UEs as well as other eNB implementation dependent information. This allows eNB scheduling flexibility and control of the resources and UEs used.

Relay selection may be entirely transparent to the out-of-coverage UE since D2D resources used by different relays are the same.

Minimizes impact to D2D broadcast functionality/PC5 interface and limits changes to Uu interface only.

In fact this can be compatible even with an out-of-coverage which implements only Rel-12 D2D functionality (assuming NAS layer deals with routing—the fact that a relay is involved is transparent entirely). Impact to PC5 interface PHY/MAC/RLC/RRC/PDCP can be avoided entirely. Only relay UEs need to implement new measurement functionality and signalling to/from eNB.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

Annex 1:

The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink shared channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control (RRC) signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Each uplink subframe may include a plurality of different channels, for example a physical uplink shared channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

Annex 2:

As shown in FIG. 6 a UE 605 first receives a measurement control message M1 and then performs packet data transmissions to and from the UE 605 shown by an operation S1. In an uplink allocation message the source eNB 606 transmits an allocation of resources to the UE 605. The UE 605 after performing measurements transmits a measurement report message to the source eNB 606. In a process step 612 the UE determines whether or not to handover to a target base station in this case the target eNB 608. The source eNB 606 then transmits a handover request message in a message M4 and the target eNB 608 performs an admission control step S5. The target eNB 608 transmits a handover request acknowledgement M6 to the source eNB 606 which then transmits a downlink allocation message 614 to the UE 605. An RRC collection re-confirmation and mobility control information is then transmitted by the source eNB 606 to the UE 605 in preparation former handover in a message M7. In steps 616, 618 and the UE 605 detaches from the old cell and synchronises with the new cell and buffers data 617 for transmission via the target eNB. In the message M8 the source eNB 606 transmits a status transfer and follows by data forwarding in a transmission step 620. The target eNB 608 then buffers packets from the source eNB 608 for the downlink transmission 622 under instruction from the MME 624. The UE then transmits a synchronisation message M9 and receives an uplink allocation of resources the message M10 which is acknowledged by an RRC connection confirmation repeat message M11. In process steps S3 the eNB transmits data packets to and from the target eNB to the serving gateway. The target eNB 608 then transmits a path switch request to the MME 624 which transmits a modified bearer request to the serving gateway 630 in a message M13. In a step S14 the serving gateway then switches the downlink path which is transmitted to the source eNB 601 in a message S4. The source eNB then transmits an end marker message to the target eNB 602 in a step S6 and the data packets are transmitted from the target eNB to the serving gateway S8. The serving gateway 630 then transmits a modifying bearer request message M15 to the MME 624 which then transmits a path switch request acknowledgement message M16 to the target eNB 608 and the target eNB 608 transmits a UE context release message M17 to the source eNB 606. The source eNB 606 then performs a release resources process in step S10.

Various further aspects and features according to example embodiments are defined in the following numbered paragraphs:

Paragraph: 1. A communications device, comprising
a transmitter configured to transmit signals to one or more other communications devices via a wireless access interface in accordance with a device-to-device communications protocol and the wireless access interface for transmitting signals to an infrastructure equipment of a mobile communications network when within a radio coverage area of the infrastructure equipment,
a receiver configured to receive signals from the one or more other communications devices via the wireless access interface, and the wireless access interface for receiving signals from the infrastructure equipment of the mobile communications network when within the radio coverage area of the infrastructure equipment, and
a controller for controlling the transmitter and the receiver to transmit or to receive the signals via the wireless access interface to transmit or to receive data represented by the signals, and the controller is configured with the transmitter and the receiver
to transmit signals representing the data to one or more in-coverage communications devices forming with the communications device a group, one of the in-coverage communications devices acting as an active relay node for the communications device, so that the in-coverage communications device is able to transmit signals representing the data to the infrastructure equipment of the mobile communications network, and to receive signals representing the data from the in-coverage communications device acting as the active relay node, wherein the signals transmitted to the in-coverage communications device and the signals from the in-coverage communications device acting as the active relay nodes are transmitted via predetermined communications resources according to the device-to-device communications protocol, the signals transmitted to the in-coverage communications device being received according to the device-to-device communications protocol, wherein the signals transmitted by the communications device or received by the communications device include an identifier which identifies a connection between the communications device and the in-coverage communications device acting as the active relay node.

Paragraph: 2. A communications device according to paragraph 1, wherein the identifier is a unicast identifier, which identifies the connection between the communications device and the in-coverage communications device acting as an active relay node.

Paragraph: 3. A communications device according to paragraph 1, wherein the identifier identifies the group of communications devices comprising the communications device and the one or more in-coverage communications devices.

Paragraph: 4. A communications device, comprising a transmitter configured to transmit signals to one or more other communications devices via a wireless access interface in accordance with a device-to-device communications protocol and configured to transmit signals via the wireless access interface to an infrastructure equipment of a mobile communications network when within a radio coverage area of the infrastructure equipment, a receiver configured to receive signals from the one or more other communications devices via the wireless access interface in accordance with the device-to-device communications protocol and to receive signals via the wireless access interface from the infrastructure equipment of the mobile communications network when within the radio coverage area of the infrastructure equipment, and a controller for controlling the transmitter and the receiver to transmit or to receive the signals via the wireless access interface to transmit or to receive data represented by the signals, and the transmitter and the receiver are configured with the controller to receive the signals representing data transmitted by an out-of-coverage communications device which is not able to transmit signals to the infrastructure equipment, to transmit the signals representing the data received from the out-of-coverage communications device to the infrastructure equipment, or to receive the signals from the infrastructure equipment representing the data for the out-of-coverage communications device, and to transmit the signals to the out-of-coverage communications device, the communications device acting as an active relay node for the out-of-coverage communications device, wherein the signals received by the receiver from the out-of-coverage communications device and the signals transmitted by the communications device to the out-of-coverage communications device have been transmitted via predetermined communications resources of the wireless access interface according to the device-to-device communications protocol, the signals transmitted by the out-of-coverage communications device and the communications device including an identifier which identifies the connection between the communications device and the out-of-coverage communications device.

Paragraph: 5. A communications device according to paragraph 4, wherein the identifier is a unicast identifier, which identifies the connection between the communications device and the in-coverage communications device acting as an active relay node.

Paragraph: 6. A communications device according to paragraph 4, wherein the identifier is a group identifier for the group of communications devices comprising the communications device and the one or more in-coverage communications devices.

Paragraph: 7. A communications device according to paragraph 6, wherein subject to predetermined conditions the communications device stops being the active relay node for the out-of-coverage communications device and is replaced by one of the other in-coverage communications devices.

Paragraph: 8. A communications device according to paragraph 7, wherein the controller is configured in combination with the receiver and the transmitter to measure a signal strength of one or more signals transmitted by the out-of-coverage communications device, and to transmit an indication of the measured signal strength to the infrastructure equipment for the infrastructure equipment to determine whether the predetermined conditions are satisfied for replacing the active relay node with the other in-coverage communications devices.

Paragraph: 9. A communications device as claims in claim 7, wherein the controller is configured in combination with the receiver and the transmitter to measure a signal strength of one or more signals transmitted by the out-of-coverage communications device, to compare the signal strength with a predetermined threshold and subject to predetermined conditions, to transmit an indication of the measured signal strength to the infrastructure equipment, the predetermined conditions including whether the signal strength received by the communications device of the signals has fallen below the predetermined threshold.

Paragraph: 10. A communications device according to paragraph 7, 8 or 9, wherein the controller is configured in combination with the receiver and the transmitter to receive from, the infrastructure equipment an indication, that one of the other in-coverage communications devices has been selected to be the active relay node in place of the communications device, and in response to the received indication that one of the other in-coverage communications devices is to act as the active relay node for the out-of-coverage communications device, to stop transmitting the signals representing the data received from the out-of-coverage communications device, and to receive the signals representing the data transmitted by the out-of-coverage communications device to the selected other in-coverage communications device, to measure the signal strength of the received signals, and to transmit the indication of the received signal strength to the infrastructure equipment, so that the infrastructure can select the communications device as the active relay node subject to the predetermined conditions.

Paragraph: 11. A communications device according to paragraph 10, wherein the predetermined conditions include that the received signal strength of the signals transmitted by the out-of-coverage communications device and received by the other in-coverage communications device exceeds the received signal strength of the signals received by the communications device.

Paragraph: 12. A communications device, comprising
a transmitter configured to transmit signals to one or more other communications devices via a wireless access interface in accordance with a device-to-device communications protocol and to transmit signals via the wireless access interface to an infrastructure equipment of a mobile communications network when within a radio coverage area of the infrastructure equipment,
a receiver configured to receive signals from the one or more other communications devices via the wireless access interface in accordance with the device-to-device communications protocol and to receive signals via the wireless access interface from the infrastructure equipment of the mobile communications network when within the radio coverage area of the infrastructure equipment, and
a controller for controlling the transmitter and the receiver to transmit or to receive the signals via the wireless access interface to transmit or to receive data represented by the signals, and the transmitter and the receiver are configured with the controller
to receive the signals representing data transmitted by an out-of-coverage communications device which is not able to transmit signals to the infrastructure,
to measure a signal strength of one or more signals transmitted by the out-of-coverage communications device, and
to transmit an indication of the measured signal strength to the infrastructure equipment, wherein the signals received by the receiver from the out-of-coverage communications device and the signals transmitted by the communications device to the out-of-coverage communications device have been transmitted via predetermined communications resources of the wireless access interface according to the device-to-device communications protocol, and the signals can be received by one or more other in-coverage communications devices, which, with the out-of-coverage communications device and the communications device form a group of communications devices which communicate using the device-to-device communications protocol, and subject to predetermined conditions, to receive from the infrastructure equipment an indication that the communications device is to act as an active relay node for the out-of-coverage communications device.

Paragraph: 13. A communications device according to paragraph 12, wherein the signals transmitted by the out-of-coverage communications device include identifier identifying a connection between the out-of-coverage communications device and the communications, the identifier including a unicast identifier, which identifies a connection between the communications device and the in-coverage communications device acting as an active relay node.

Paragraph: 14. A communications device according to paragraph 12, wherein the signals transmitted by the out-of-coverage communications device include identifier identifying a connection between the out-of-coverage communications device and the communications, the identifier including a group identifier for the group of communications devices comprising the communications device and the one or more in-coverage communications devices.

Paragraph: 15. A communications device according to paragraph 14, wherein the controller is configured in combination with the receiver and the transmitter,
in response to receiving the indication that the communications device is to act as the active relay node,
to transmit the signals representing the data received from the out-of-coverage communications device to the infrastructure equipment, or
to receive the signals from the infrastructure equipment representing the data for the out-of-coverage communications device, and
to transmit the signals to the out-of-coverage communications device.

Paragraph: 16. A communications device according to paragraph 14 or 15, wherein the predetermined conditions include that the received signal strength of the signals transmitted by the out-of-coverage communications device and received by the other in-coverage communications device exceeds the received signal strength of the signals received by the communications device.

Paragraph: 17. A communications device according to paragraph 14, 15 or 16, wherein the predetermined conditions include whether the signal strength received by the in-coverage communications device acting as the relay node for the signals transmitted or received by the out-of-coverage communications device has fallen below a predetermined threshold.

REFERENCES

[1] LTE for UMTS: OFDMA and SC-FDMA Based Radio Access, Harris Holma and Antti Toskala, Wiley 2009, ISBN 978-0-470-99401-6.
[2] "LTE Device to Device Proximity Services—Radio Aspects" described in RP-122009.
[3] 3GPP technical report 36.843.
[4] ftp://ftp.3gpp.org/tsg_ran/TSG_RAN/TSGR_66/Docs/RP-142229.zip
[5] EP14184600.6
[6] PCT/2014/078087
[7] PCT/2014/078093
[8] PCT/2014/079338
[9] PCT/2014/077447
[10] PCT/2014/077396
[11] PCT/2014/079335

What is claimed is:
1. Circuitry for an infrastructure equipment forming part of a mobile communications network, the circuitry being configured to:
receive an indication, from each of one or more in-coverage communications devices in a same coverage area, of a measured signal strength of one or more signals transmitted by an out-of-coverage communications device and received by the in-coverage communications devices,
based upon the received indication of the measured signal strength received from each of the one or more in-coverage communications devices, select one of the in-coverage communications devices to act as a relay node for the out-of-coverage communications device in accordance with predetermined conditions, and replace the in-coverage communications device selected to act as the relay node with one of the other in-coverage communications devices in the same coverage area in response to the received signal strength of the signals transmitted by the out-of-coverage communications device and received by the other in-coverage communications device exceeding the received signal strength of the signals received by the in-coverage communications device selected to act as the relay node, wherein a newly selected relay will use the same resources and ID as the relay node that was replaced.

2. The circuitry for the infrastructure equipment as claimed in claim 1, wherein the signals transmitted by the out-of-coverage communications device include an identifier identifying a connection between the out-of-coverage communications device and the in-coverage communications device, the identifier including a unicast identifier which identifies a connection between the out-of-coverage communications device and the in-coverage communications device acting as an active relay node.

3. The circuitry for the infrastructure equipment as claimed in claim 1, wherein the signals transmitted by the out-of-coverage communications device include an identifier identifying a connection between the out-of-coverage communications device and the in-coverage communications device, the identifier including a group identifier for the group of communications devices comprising the communications device and the one or more in-coverage communications devices.

4. The circuitry for the infrastructure equipment as claimed in claim 1, wherein the circuitry is further configured to in response to selecting the one of the in-coverage communications devices to act as a relay node for the out-of-coverage communications device, transmit an indication that the one of the in-coverage communications devices is to act as the active relay node.

5. The circuitry for the infrastructure equipment as claimed in claim 4, wherein the circuitry is further configured to,
in response to transmitting the indication that the in-coverage communications device is to act as the active relay node,
receive, from the in-coverage communications device, the signals representing the data received from the out-of-coverage communications device, or
transmit the signals representing the data for the out-of-coverage communications device, and
receive the signals to the out-of-coverage communications device.

6. The communications device as claimed in claim 1, wherein the predetermined conditions include that the received signal strength of the signals transmitted by the out-of-coverage communications device and received by the other in-coverage communications device exceeds the received signal strength of the signals received by the in-coverage communications device.

7. The communications device as claimed in claim 1, wherein the predetermined conditions include whether the signal strength received by the in-coverage communications device acting as the relay node for the signals transmitted or received by the out-of-coverage communications device has fallen below a predetermined threshold.

8. A method, comprising:
receiving an indication, from each of one or more in-coverage communications devices in a same coverage area, of a measured signal strength signal of one or more signals transmitted by an out-of-coverage communications device and received by the in-coverage communications devices; and
based upon the received indication of the measured signal strength received from each of the one or more in-coverage communications devices, selecting one of the in-coverage communications devices to act as a relay node for the out-of-coverage communications device in accordance with predetermined conditions, and
replacing the in-coverage communications device selected to act as the relay node with one of the other in-coverage communications devices in the same coverage area in response to the received signal strength of the signals transmitted by the out-of-coverage communications device and received by the other in-coverage communications device exceeding the received signal strength of the signals received by the in-coverage communications device selected to act as the relay node, wherein a newly selected relay will use the same resources and ID as the relay node that was replaced.

9. The method of claim 8, wherein the signals transmitted by the out-of-coverage communications device include an identifier identifying a connection between the out-of-coverage communications device and the in-coverage communications device, the identifier including a unicast identifier which identifies a connection between the out-of-coverage communications device and the in-coverage communications device acting as an active relay node.

10. The method of claim 8, wherein the signals transmitted by the out-of-coverage communications device include an identifier identifying a connection between the out-of-coverage communications device and the in-coverage communications device, the identifier including a group identifier for the group of communications devices comprising the out-of-coverage communications device and the one or more in-coverage communications devices.

11. The method of claim 8, further comprising:
in response to selecting the one of the in-coverage communications devices to act as a relay node for the out-of-coverage communications device, transmitting an indication that the one of the in-coverage communications devices is to act as the active relay node.

12. The method of claim 11, further comprising:
in response to transmitting the indication that the in-coverage communications device is to act as the active relay node,
receiving, from the in-coverage communications device, the signals representing the data received from the out-of-coverage communications device; or
transmitting the signals representing the data for the out-of-coverage communications device, and
receiving the signals to the out-of-coverage communications device.

13. The method of claim 8, wherein the predetermined conditions include that the received signal strength of the signals transmitted by the out-of-coverage communications device and received by the other in-coverage communications device exceeds the received signal strength of the signals received by the in-coverage communications device.

14. The method of claim 8, wherein the predetermined conditions include whether the signal strength received by the in-coverage communications device acting as the relay node for the signals transmitted or received by the out-of-coverage communications device has fallen below a predetermined threshold.

15. Circuitry for a communications device, the circuitry being configured to:

transmit signals to an out-of-coverage communications device, the communications device acting as an active relay node for the out-of-coverage communications device, wherein the communications device stops being the active relay node for the out-of-coverage communications device and is replaced by another in-coverage communications device in a same coverage area in response to a received signal strength of the signals received by the out-of-coverage communications device and received by the another in-coverage communications device exceeds the received signal strength of the signals received by the communications device, wherein another in-coverage communications device will use the same resources and ID as the communications device.

16. The circuitry of claim 15, wherein the identifier is a group identifier for the group of communications devices comprising the out-of-coverage communications device and one or more in-coverage communications devices including the communications device.

17. The circuitry of claim 16, wherein the circuitry is configured in combination with the receiver circuitry and the transmitter circuitry to measure a signal strength of one or more signals transmitted by the out-of-coverage communications device; and transmit an indication of the measured signal strength to infrastructure equipment for the infrastructure equipment to determine whether the predetermined conditions are satisfied for replacing the active relay node with the other in-coverage communications devices.

18. The circuitry of claim 16, wherein the circuitry is configured to measure a signal strength of one or more signals transmitted by the out-of-coverage communications device;

compare the signal strength with a predetermined threshold; and subject to predetermined conditions, transmit an indication of the measured signal strength to infrastructure equipment, the predetermined conditions including whether the signal strength received by the communications device of the signals has fallen below the predetermined threshold.

19. The circuitry of claim 16, wherein the circuitry is configured to receive, from infrastructure equipment, an indication that one of the other in-coverage communications devices has been selected to be the active relay node in place of the communications device;

in response to the received indication that one of the other in-coverage communications devices is to act as the active relay node for the out-of-coverage communications device, to stop transmitting the signals representing the data received from the out-of-coverage communications device, and receive the signals representing the data transmitted by the out-of-coverage communications device to the selected other in-coverage communications device, measure the signal strength of the received signals, and transmit the indication of the received signal strength to the infrastructure equipment, so that the infrastructure can select the communications device as the active relay node subject to the predetermined conditions.

\* \* \* \* \*